(12) United States Patent
Li et al.

(10) Patent No.: US 9,727,901 B2
(45) Date of Patent: Aug. 8, 2017

(54) SYSTEMS AND METHODS FOR IMAGE-BASED RECOMMENDATIONS

(71) Applicant: Yahoo! Inc., Sunnyvale, CA (US)

(72) Inventors: Ralph Li, Taipei (TW); Evans Tseng, Taipei (TW); Brian Liu, Taipei (TW)

(73) Assignee: YAHOO! INC., Sunnyvale, CA (US)

(*) Notice: Subject to any disclaimer, the term of this patent is extended or adjusted under 35 U.S.C. 154(b) by 133 days.

(21) Appl. No.: 13/916,886

(22) Filed: Jun. 13, 2013

(65) Prior Publication Data

US 2014/0372951 A1 Dec. 18, 2014

(51) Int. Cl.
*G06Q 30/06* (2012.01)
*G06Q 30/02* (2012.01)
*G06F 17/30* (2006.01)

(52) U.S. Cl.
CPC ......... *G06Q 30/0601* (2013.01); *G06F 17/30* (2013.01); *G06Q 30/02* (2013.01)

(58) Field of Classification Search
CPC .................................................. G06F 3/0482
USPC ........................................................ 715/735
See application file for complete search history.

(56) References Cited

U.S. PATENT DOCUMENTS

| 2002/0138481 | A1* | 9/2002 | Aggarwal | G06Q 30/02 |
| 2002/0168117 | A1* | 11/2002 | Lee | G06F 17/30265 |
| | | | | 382/305 |
| 2004/0230843 | A1* | 11/2004 | Jansen | G06F 21/36 |
| | | | | 726/7 |
| 2008/0082426 | A1* | 4/2008 | Gokturk | G06F 17/30256 |
| | | | | 705/26.62 |
| 2011/0176724 | A1* | 7/2011 | Yang | G06K 9/6252 |
| | | | | 382/159 |
| 2012/0239781 | A1* | 9/2012 | Yamahara | G06Q 10/00 |
| | | | | 709/217 |

* cited by examiner

*Primary Examiner* — David Spellman
(74) *Attorney, Agent, or Firm* — James J. DeCarlo; Greenberg Traurig, LLP

(57) ABSTRACT

An image-based recommendation system provides a first set of selectable images to a user and receives user selections from the first set of images. If a user selects a single image from the first set of images, the product page associated with the selected image is transmitted to the user. If the user makes multiple selections from the first set of images, then the images associated with the user selections are analyzed and a second set of similar images is generated for transmission to the user. The process of receiving and analyzing user-selected images, generating image sets and transmission of generated images sets continues until the user selects a single image. The precision of identification of similar images can be improved by providing the user selections as training data to the image-based recommendation system.

7 Claims, 11 Drawing Sheets

SYSTEMS AND METHODS FOR IMAGE-BASED RECOMMENDATIONS

BACKGROUND

The evolution of the Internet led to the maturity of ecommerce where vendors can sell various products over digital communication networks. Users can employ their devices to connect to the vendors website to browse and buy the various items. In the recent past stationary devices like desktops were primarily used for browsing and shopping activity. The users could view the various images, select the products for closer or more magnified views and buy them via secure transactions. The purchased products are shipped to the users' chosen destination. Ecommerce has not only mitigated the need for vendors to maintain brick and mortar stores in various areas but also facilitates those vendors with stores to increase the products they can sell via the websites without necessitating them to maintain vast inventories at the physical stores.

SUMMARY

This disclosure relates to systems and methods for image-based recommendations that provide images to the users, receive users' selections from the provided images for making further recommendations in an interactive manner. A processor-implemented method for providing image-based recommendations is disclosed in accordance with one embodiment. The method comprises, providing, by a processor, a plurality of images for selection to a user, receiving user selections from the plurality of images and determining, by the processor, the number of user selections from the plurality of images. If the number of user selections from the plurality of images is equal to or greater than two, the processor is further configured for extracting features of the user selected images, retrieving other images from a data store, clustering, the other images and the user-selected images based on the extracted features, identifying at least one cluster comprising at least one of the user-selected images and transmitting images from the at least one cluster as similar images for further selection to the user. In an embodiment, a SIFT (Scale Invariant Feature Transform) algorithm is used for extracting the features of the user-selected images. In an embodiment, a KNN (K nearest neighbor) algorithm is used for the clustering. In an embodiment, the processor identifies the other images based on tags associated with the user-selected images and the other images. In an embodiment, the processor is also configured to rank the similar images from the at least one cluster based on respective relevancies to the user-selected images prior to the transmission. The ranking is employed by the processor to configure a display of the similar images in a manner that is indicative of their respective ranks. If no images are selected from the plurality of images, the processor is configured to provide a second plurality of images to the user.

In an embodiment when the number of user selections is equal to one the processor is configured to provide details of a product associated with a user-selected image and facilitating purchase of the product associated with the user-selected image. In addition, when only one of the images is selected, the processor also provides the user-selected image as training data for increasing accuracy of the identification of the other similar images.

A computing device comprising a processor and a storage medium for tangibly storing thereon program logic for execution by the processor is disclosed in an embodiment. In an embodiment, the program logic comprises image providing logic, executed by the processor, for providing a plurality of images for selection to a user, selection receiving logic for receiving user selections from the plurality of images and number determining logic for determining a number of user selections from the plurality of images. The programming logic also comprises image retrieving logic for retrieving other images from a data store and feature extracting logic for extracting features of the user selected images, if the number of user selections is equal to or greater than two. The programming logic further comprises clustering logic for clustering the other images and the user-selected images based on the extracted features, identifying logic for identifying at least one cluster comprising at least one of the user-selected images and transmitting logic for transmitting images from the at least one cluster as similar images for selection to the user. When the number of user selections is equal to one, the processor further executes, providing logic for providing details of a product associated with a user-selected image, purchase facilitating logic for facilitating purchase of an item/product associated with the user-selected image and training logic for providing the user-selected image as training data for increasing accuracy of the identification of the other similar images. In an embodiment, the processor executes ranking logic for ranking the similar images from the at least one cluster based on respective relevancies to the user-selected images prior to the transmission and configuring logic for configuring a display of the similar images based on the ranking.

A computer readable storage medium comprising processor-executable instructions is disclosed in an embodiment. The instructions when executed by the processor cause the processor to provide a plurality of images for selection to a user, receive user selections from the plurality of images and determine a number of user selections from the plurality of images. If the number of user selections from the plurality of images is equal to or greater than two, the instructions further cause the processor to extract features of the user selected images, retrieve other images from a data store, cluster the other images and the user-selected images based on the extracted features, identify at least one cluster comprising at least one of the user-selected images and transmit images from the at least one cluster as similar images for selection to the user. In one embodiment, the instructions cause the processor to rank the similar images from the at least one cluster based on respective relevancies to the user-selected images prior to the transmission and to configure a display of the similar images based on the ranking.

In an embodiment, when the number of user selections is equal to one the instructions cause the processor to provide details of a product associated with a user-selected image to facilitate purchase of the product associated with the user-selected image when the number of user selections is equal to one. The instructions further cause the processor to provide the user-selected image as training data for increasing accuracy of the identification of the other similar images.

These and other embodiments/will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
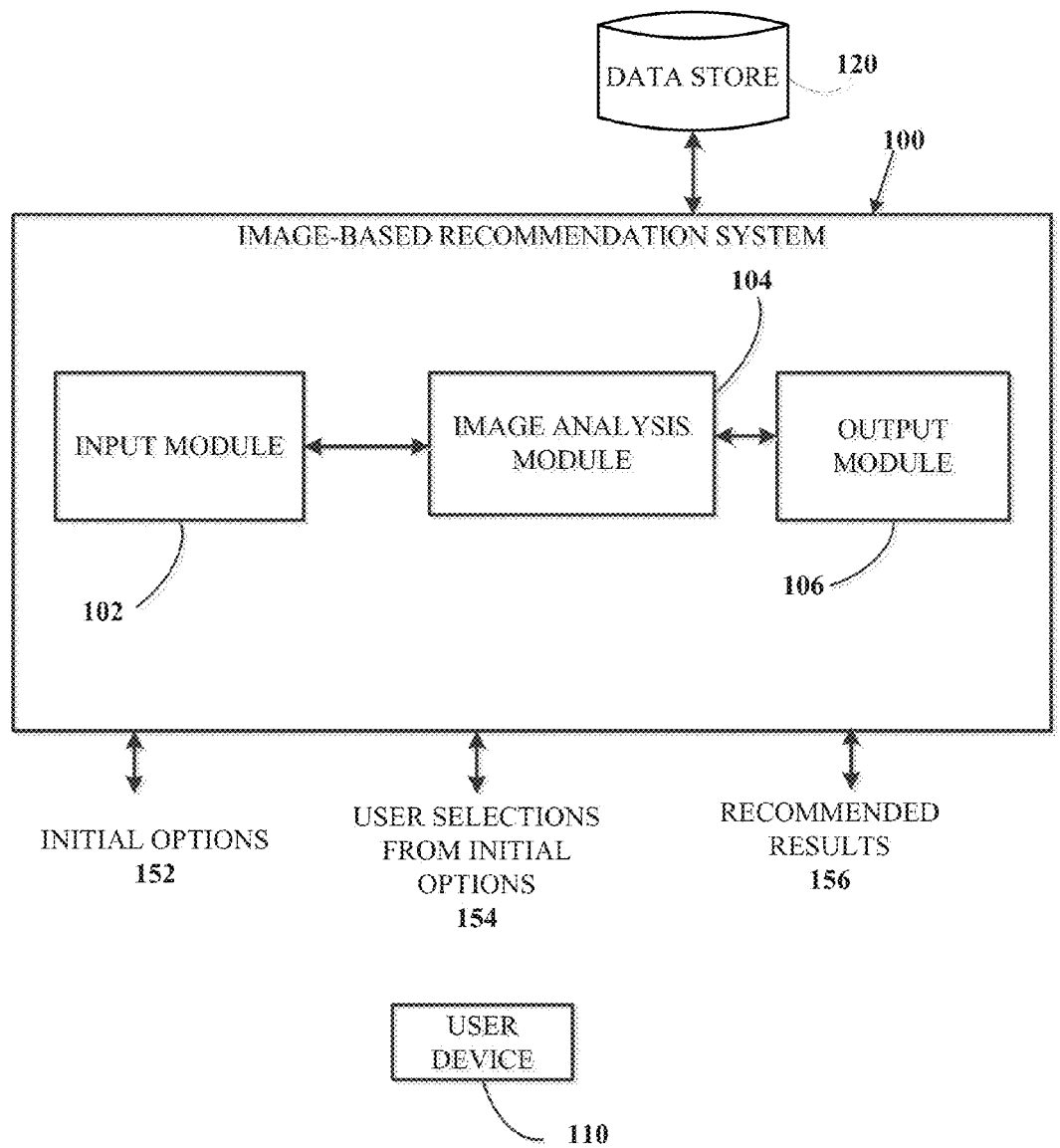
FIG. 1 shows an image-based recommendation system that recommends products to users by employing image grouping algorithms to group product images in accordance with one embodiment.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The emergence of online stores provides users with the flexibility of when and where they would like to shop for goods as it mitigates the need for users to visit a physical brick-and-mortar store for making purchases. The proliferation of mobile devices for transmission of image, text and video data in addition to voice data provides for even greater flexibility in the users' shopping experiences. When a user visits the website of a vendor selling goods on the Internet, the user has various options to browse for and find products of interest. For example, the user can start with browsing the best-selling items or categories or other listings the vendor includes on the website or the user can search for a particular item via typing in a text query into a search box that can be provided on the website or the user can browse listings tailored to the user's profile. There can be instances where a user is browsing through various items without knowing the exact item that the user requires in which case the user may not be able to formulate a text query for searching for the exact item. Another instance where inputting text queries is not very convenient is when the user is employing a mobile device such as a smartphone with a small keypad. The user's fingers may not move with enough precision on the tiny keypad in which case the user may need to input the text query multiple items. In such instances, it can be very useful to provide users with certain information from which they can select what they need via a few clicks/taps or other simple gestures.

Embodiments described herein facilitate initially providing a user with certain image information, receiving user input such as user selection of the image information, employing the received user input as feedback to further filter or refine the image information provided to the user and transmitting recommendations based on the filtered/refined image information. This facilitates refining the user's search without requiring the user to provide any explicit text input.

It may be appreciated that although various embodiments are described herein with respect to a shopping website, they may also be implemented in other online information resources wherein user selections of image information can be used to narrow, refine or filter the results provided to the user.

Turning now to the figures, FIG. 1 shows an image-based recommendation system 100 that recommends products to users by employing image grouping algorithms to group product images. The recommendation system 100 can be implemented as hardware, software or combinations thereof and comprises an input module 102, an image analysis module 104 and output module 106. In an embodiment, the recommendation system 100 can be associated with an eCommerce website (not shown) and the output module 106 provides the initial options 152 to the user device 110 for example, via an online advertisement or in an email. In an embodiment, the user may navigate to the eCommerce website with the user device 110 and may be provided with the initial options 152 by the output module 106. In an embodiment, the initial options 152 can include a first plurality or a first set of images or combinations of images and text retrieved from the data store 120 and can either comprise listings that are directed towards a broad user base. For example, the initial options 152 can include a listing of the best-selling items across product categories in the eCommerce website or the initial options 152 can comprise images of items that are targeted towards the particular user receiving the initial options 152 based on the user's unique preferences as recorded in the data store 120. In an embodiment, the input module 102 receives the user's selections 154 from the initial options 152 and provides them to the image analysis module 104. In an embodiment, the user can select a single item from a plurality of initial options 152. In this instance, the user can be directed to the shopping cart or other page of the eCommerce website that facilitates purchase or other action by the user on the single item that was selected. In an embodiment, if the user does not select any of the initial options 152, the user can continue to scroll or browse through the website. In this case, the recommendation system 100 can either generate more image listings for presentation to the user as the initial options 152 from which the user can select. For example, the webpage the user is viewing on the user device 110 can include a link which facilitates the user to receive more recommendations.

In an embodiment, the eCommerce website can facilitate the user to select a plurality or multiple ones of the initial options 152. The multiple user selections 154 are received at the input module 102 are transmitted to the image analysis module 104 which is configured to analyze the images associated with the user selections 154 and present the user with further relevant recommendations or results 156 based on the user's selections 154 in accordance with embodiments described in detail further infra. In an embodiment, the recommendations 156 can comprise other images of products from image clusters that the image analysis module 104 determines are relevant to the user's search based on the multiple user selections 154. Thus, the user's selections 154 are employed as a feedback mechanism within the recommendation system 100 for further processing the initial options 152 to identify or aid the user to identify the purpose of the search. This procedure of receiving user selections and presenting user with recommendations can be repeated until the user concludes the search with the selection of a single item at which time the user is transferred to the product page of the selected item to facilitate its purchase by the user. When users are unable to express exactly what they want or what to expect using traditional keyword-matching search, an image-based recommendation system 100 as described herein can help by giving them some related items as a group of suggestions.

In an embodiment, the output module 106 can be configured to present the images from the recommended results 156 on a display associated the user device 110 in a manner that is indicative of the extent of their similarity to the user's selections 154. In one embodiment, the recommended images 156 can be presented so that their size is indicative of their relevance or similarity with the user's selections 154 so that more relevant ones of the results 156 are presented as larger images. In an embodiment, the recommended results 156 can be presented to that their arrangement is indicative of their relevance to the user's selections. For example, the recommended results 156 can be arranged circularly so that the more relevant results are presented at the center of the circle and the less relevance results are arranged on the circumference or periphery of the circle. In an embodiment, a combination of the aforementioned schema can be implemented to indicate the relevance or similarity of the results. For example, the recommended results 156 can be arranged as a circle with the more relevant results presented at the center of the circle and the relative sizes at the center of the circle being indicative of their relative relevance to the user's selections 154.

Figure 2:
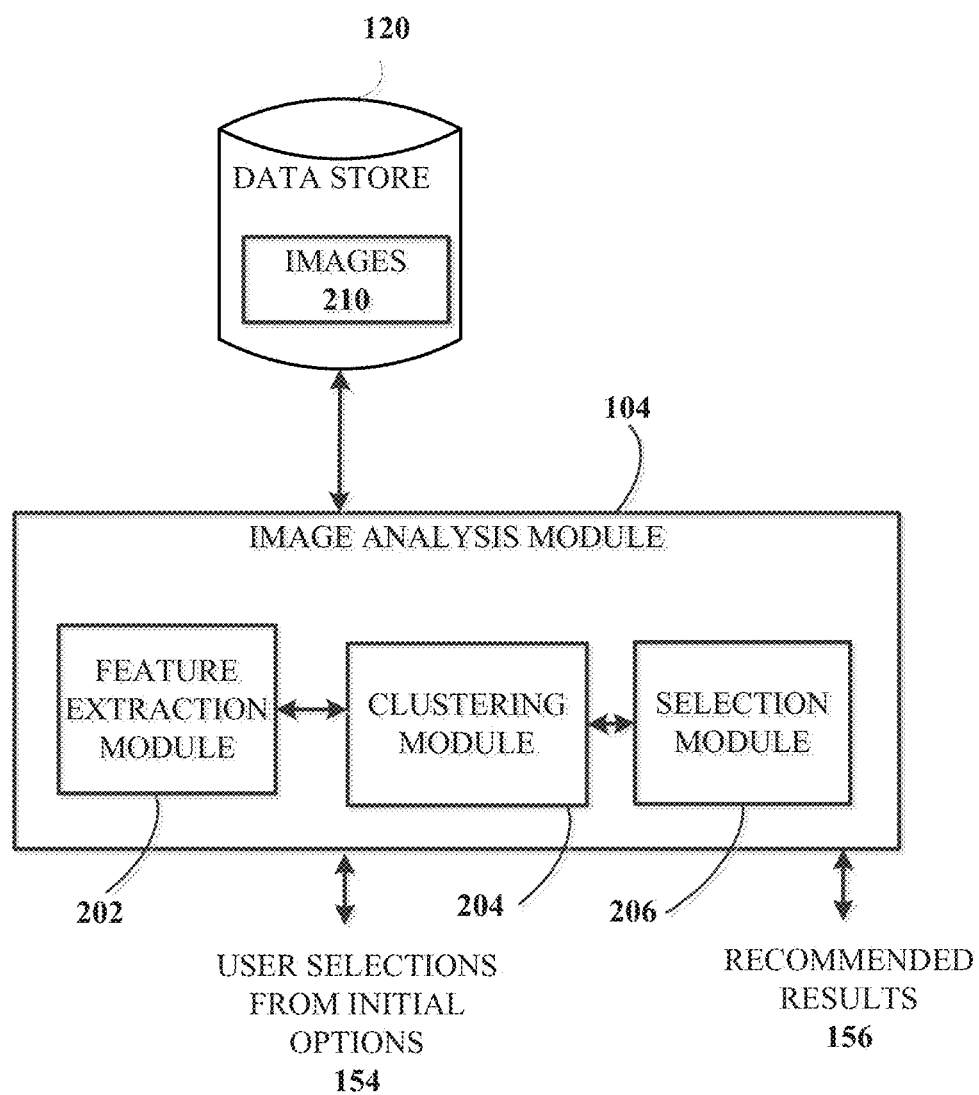
FIG. 2 is a schematic diagram showing sub-modules within the image analysis module in accordance with one embodiment.

FIG. 2 is a schematic diagram showing sub-modules within the image analysis module 104 in accordance with one embodiment. The image analysis module 104 comprises a feature extraction module 202, a clustering module 204 and a selection module 206. The image analysis module 104 receives the user selections 154 from the initial options 152 and the features of the images included in the user selections 154 are extracted. Any currently known algorithm or an algorithm that is yet to be invented can be employed for the extraction. In an embodiment, an image processing algorithm such as SIFT (Scale Invariant Feature Transform) is employed to extract features from the images associated with the user selections 154. In an embodiment, image features such as but not limited to, color, tone, alpha can be used to construct a vector of each image associated with the user selections 154 and of each of the images 210 comprised in the data store 120. The clustering module 204 generates clusters of the images associated with the user selections 154 and other images 210 from the data store 120. One or more clusters that are closest to the images associated with the user selections 154 are identified. For example, unsupervised learning processes such as KNN (K nearest neighbors) algorithm can be used to classify the images to particular clusters. While the classification of images into clusters is described herein based on the image features extracted by the feature extraction module 202, other image characteristics such as tags or text associated with the images can also be used along with the image features by the clustering module 204 for classifying the images into clusters.

The selection and ranking module 206 selects other images from the clusters to which the images associated with the user selections 154 belong and ranks the selected images based on their similarities to the user selections 154 for transmission to the user as recommended results 156. Thus, the image analysis module 104 is configured to receive as input user selections from a set of images and employ such input in making further recommendations to the user. If the user is searching for particular products, the image-based recommendation system 100 is configured to provide the search results and other relevant recommendations in the recommended results 156 thereby providing diversity in the recommended results while maintaining good relevance.

The image analysis module 104 is embodies a model generated and trained via various machine learning methodologies in accordance with one aspect. For example, training images represented as vectors in a multidimensional feature space, wherein each vector has a cluster label associated therewith can be provided to train the image analysis module 104. Subsequently, raw data can be provided to the image analysis module 104 for classification and the output from the image analysis module 104 can be independently verified via other classification methodologies to determine its precision of classification. If the image analysis module 104 classifies the raw data with a precision greater than a predetermined threshold, for example, sixty percent, it can be considered for implementation in the image-based recommendation system 100. If the image analysis module 104 fails to meet the precision threshold for classification, it can be further trained via providing more training data and further tested until the predetermined precision threshold is reached. In an embodiment, the image analysis module 104 can be trained constantly with respect to similarity determinations by providing as feedback, the user selections 154 and further user selections from the recommended results 156 until the user selects one of the recommended results 156 for purchase. Therefore, the image analysis module 104 can be improved via various machine learning algorithms as new data/images are added to the recommendation system 100.

Figure 3:
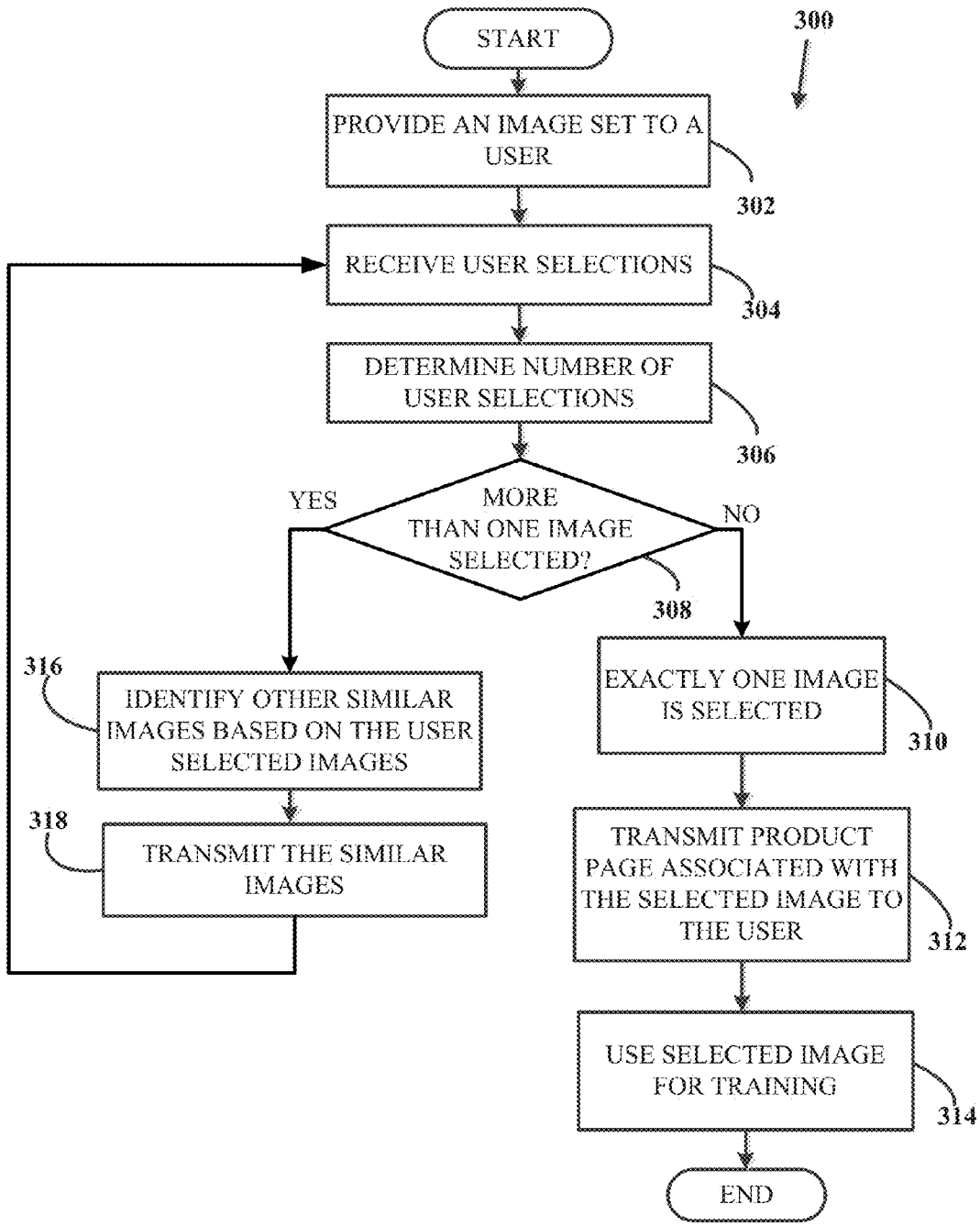
FIG. 3 illustrates a flowchart that details a method of providing image-based recommendations in accordance with one embodiment.

FIG. 3 illustrates a flowchart 300 that details a method of providing image-based recommendations in accordance with one embodiment. The method commences with the user receiving a set of images at 302. In an embodiment, the user can initially receive a first plurality or a first set of selectable images in response to a query. In an embodiment, the user can initially receive at the user device 110, the first plurality or a first set of images unsolicited via an online advertisement, an email or other messaging system which may be based on, for example, a user profile stored in the eCommerce system. User selections from the transmitted image set are received at 304. If no user selections are received, the recommendation system 100 can continue to transmit new images to the user as the user accesses and browses the eCommerce website associated with the recommendation system 100. At 306, the number of selections made by the user is determined. At 308, it is determined if the user made more than one selection from the provided image set. If it is determined at 308 that the user has not made more than one selection, the process moves to step 310 wherein it is determined that the user made exactly one selection from the transmitted image set. This can indicate to the recommendation system 100 that the selected image is the desired search result for the user. Therefore, the product page associated with the selected image is transmitted to the user at 312. In an embodiment, the product page can provide various details regarding the product such as product information, reviews, and other related images in addition to facilitating the user to purchase the product. At 314, the selected image is further employed for training the image analysis module 104. Collecting user feedback in accordance with embodiments described herein can aid to further refine the grouping algorithms employed by the image analysis module 104 and connect different concepts by recording how users move from one cluster to another.

If it is determined at 308 that the user made multiple selections from the first plurality/first set of selectable images, other images associated with the recommendation system 100, for example, images of other products in the eCommerce website, that are similar to the user selected images are identified at 316, in accordance with embodiments as detailed herein. At 318 the similar images are transmitted to the user. In an embodiment, the method returns to 304, wherein the recommendation system 100 receives further user selections from the transmitted set of similar images. If the user selections from the transmitted set of similar images are received at 304, the method proceeds to determine the number of user selections as shown at 306 and if multiple user selections are received, the steps 316 of extracting features from the user selected images, determining other similar images at 318, ranking the similar images as shown at 320 and transmitting the ranked set of images 320 are repeated. The repetitions can continue so long as the user makes multiple selections from a received set of images. The method terminates when the user selects a single image as shown at 310, in which case the product page of the selected image can be transmitted to the user at 312 and the selected, single image is provided for training at 314.

Figure 4:
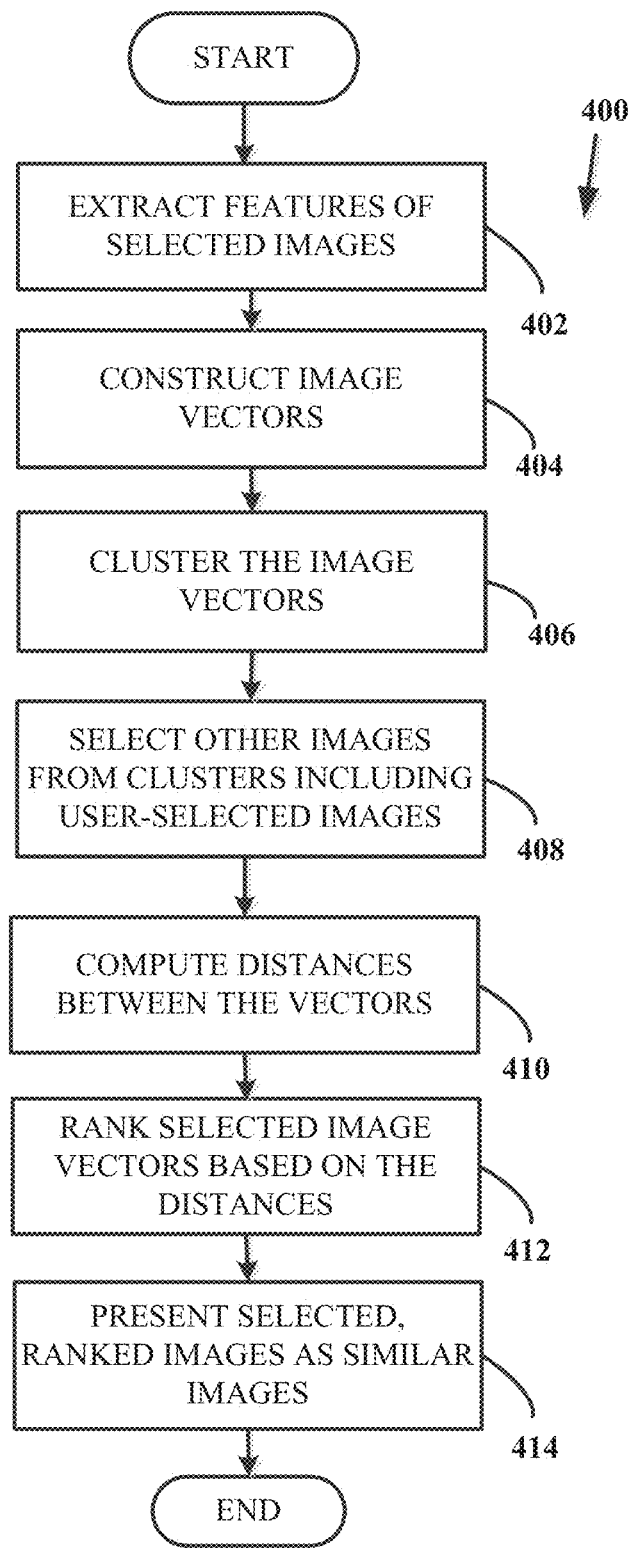
FIG. 4 is a flowchart detailing a method of identifying images similar to user selections in accordance with one embodiment.

FIG. 4 is a flowchart 400 illustrating a method of identifying images similar to user selections in accordance with one embodiment. The method begins at 402 wherein the various features associated with the user selected images are extracted. In an embodiment, an image processing algorithm such as SIFT is employed to extract the image features. Various image features such as color, tone, alpha can be extracted. At 404, vectors of images in the data store 120 are constructed based on the extracted image features. At 406, the vectors representing the images are clustered. Any known clustering algorithm such as the KNN (K nearest neighbor) algorithm or any clustering algorithm that is yet to be invented can be used for image classification at 406. At 408, other images from clusters that includes the user-selected images are selected as being similar images that can be presented to the user. At 410, distances between the selected vectors representing the images in the data store 120 and vectors representing the user selected images are computed using different algorithms with the image features as computing factors. At 412, the selected vectors in the data store 120 are ranked based on their distances to the vectors of the user selected images. At least a subset of the images of the ranked, selected vectors are presented as similar images to the user at 414. In an embodiment, the images can be presented in a manner indicative of their rank, and hence their relevance to the user-selected images. For example, the image sizes can be varied so that the image whose vector is the closest to a vector of one of the user-selected images has a largest size or is most prominently displayed. Although, it is described that the extracted image features are used in construction of the image vectors and computation of their relevance to the user-selected images, it may be appreciated that other image elements, such as, a source associated with an image, tags, labels or other text associated with or included in the image can also be factored into image similarity computations in accordance with one embodiment.

Figure 5:
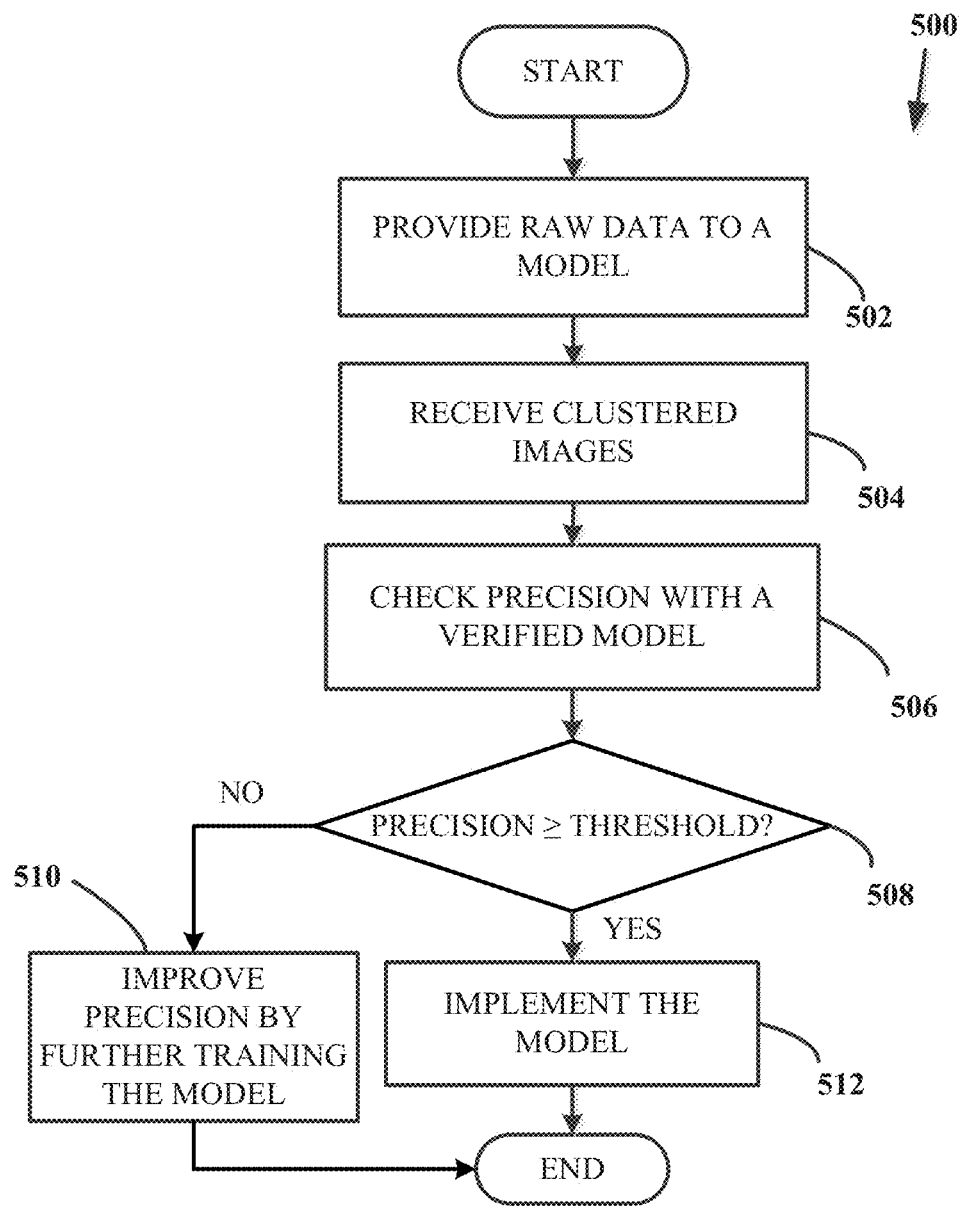
FIG. 5 is a flowchart that details a method of verifying a precision of identification of the similar images to be recommended in accordance with one embodiment.

FIG. 5 is a flowchart 500 that details a method of verification of the precision of the image analysis module 104 for identifying similar images for recommendations in accordance with one embodiment. The method begins at 502 with providing raw data to the image analysis module 104. For example, the raw data can comprise a plurality of random images which are yet to be classified and which may or may not have any text data such as, tags, label, source associated therewith. At 504, the images that are classified into different clusters are received. At 506, the precision of classification is verified, for example, by feeding the same raw data initially fed to the image analysis module 104 being tested to another verified model. If it is determined at 508 that the precision of the image analysis module 104 being tested is greater than or equal to a predetermined threshold, then the image analysis module 104 is implemented in the image analysis module 104 at 512. In one embodiment, the predetermine threshold of precision can be, for example, sixty percent. If it is determined at 508 that the precision of the the image analysis module 104 being tested is lower than the pre-determined threshold precision then, the precision of the image analysis module 104 being tested can be increased by further providing it with more training data at 510.

Figure 6:
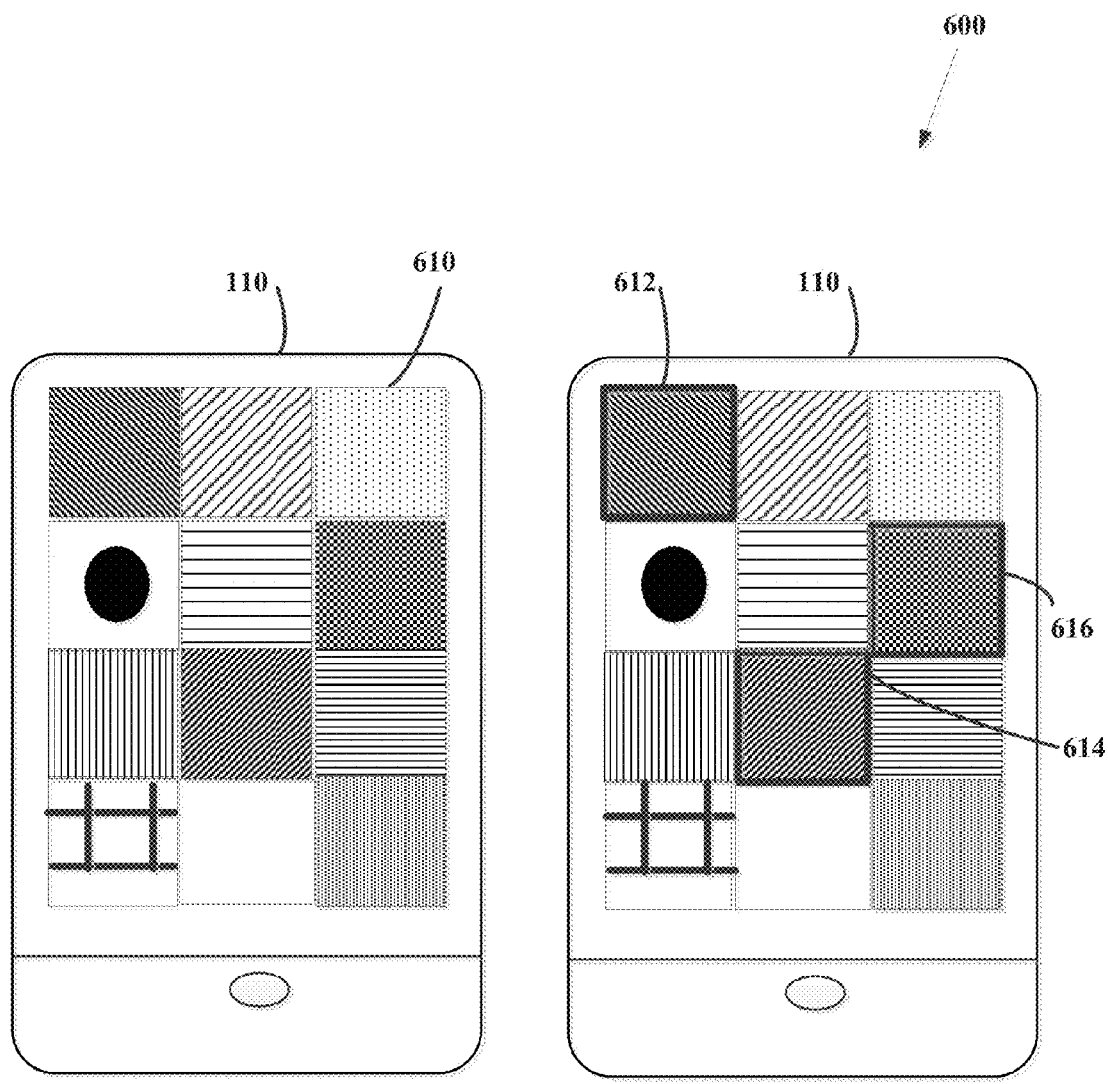
FIG. 6 is a schematic diagram illustrating an embodiment of a user interface presented on a user device in accordance with one embodiment.

FIG. 6 is a schematic diagram 600 illustrating an embodiment of a user interface presented on a user device 110 showing an initial set 610 of twelve selectable images that are initially presented to the user. As described supra, the initial set of selectable images can be displayed either in response to a user query or it may be provided to the user via an advertisement or other message that is pushed without any explicit user request. The images 612, 614 and 616 are selected by the user from the initial set of images. The selections 612, 614 and 616 made by the user are received by the image-based recommendation system 100 where their features are analyzed and images similar to the images 612, 614 and 616 are identified and transmitted back to the user device 110.

Figure 7A:
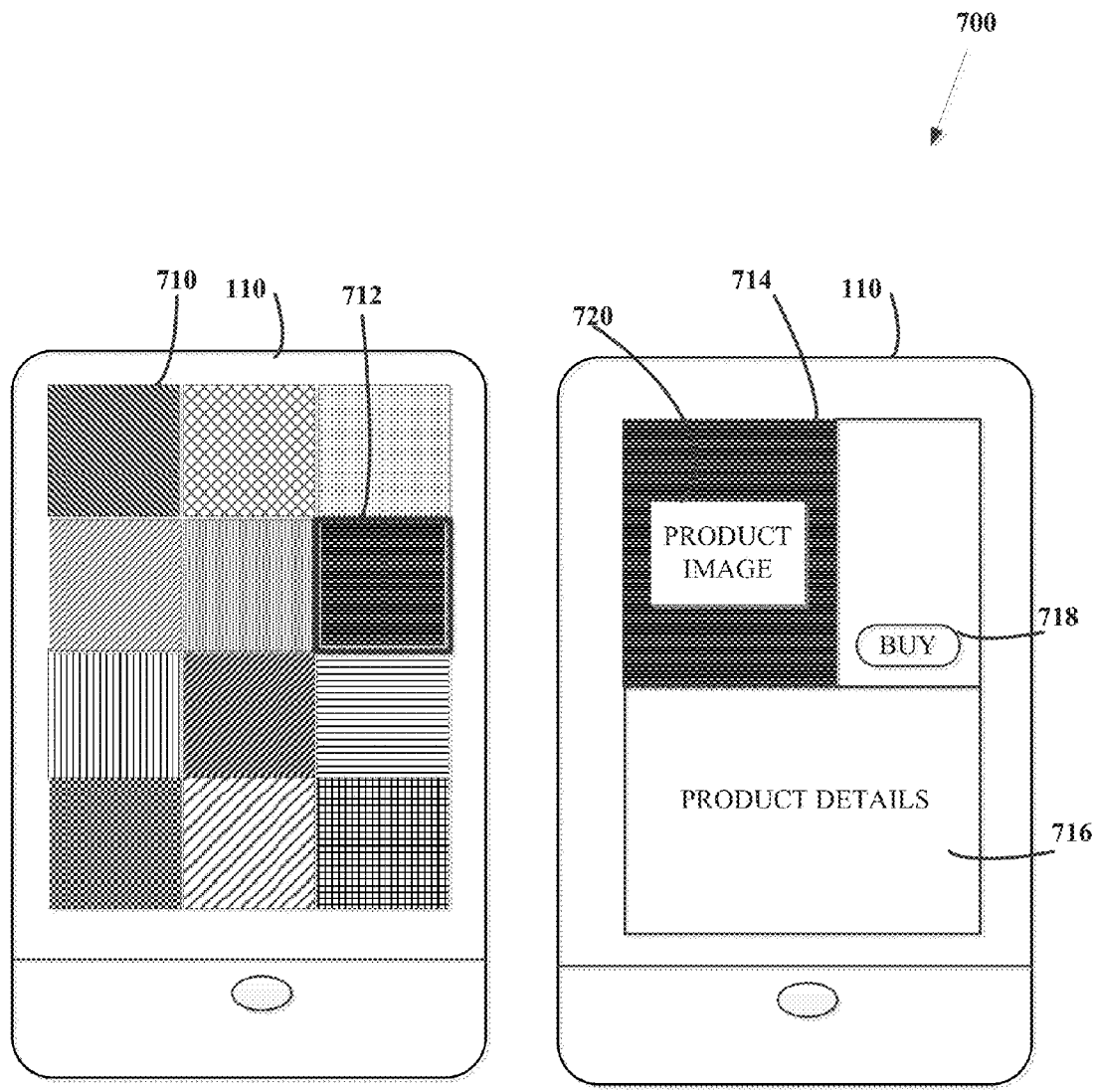
FIG. 7a is a schematic diagram of a user interface showing a second set of selectable images in accordance with one embodiment.

FIG. 7a is a schematic diagram 700 of a user interface showing a second set of selectable images 710 that are received by the user device 110 in response to the selections 612, 614 and 616 made from the initial set of images 610. It may be noted that the images shown in the second set 710 are less diverse or more homogenous than the initial image set 610 and are more similar to the user-selected images 612, 614 and 616. In response to receiving the second set of selectable images 710, the image 712 is selected by the user. As the user has selected only one product image 712 from the second set of selectable images 710, it can be determined that the selected image 712 is the result of the user's search. Accordingly, the product page 714 of the selected product comprising the selected product image 720, product details 716 and a user interface element 718 that facilitates purchase of the product is transmitted by the image-based recommendation system 100 for display on the user device 110.

Figure 7B:
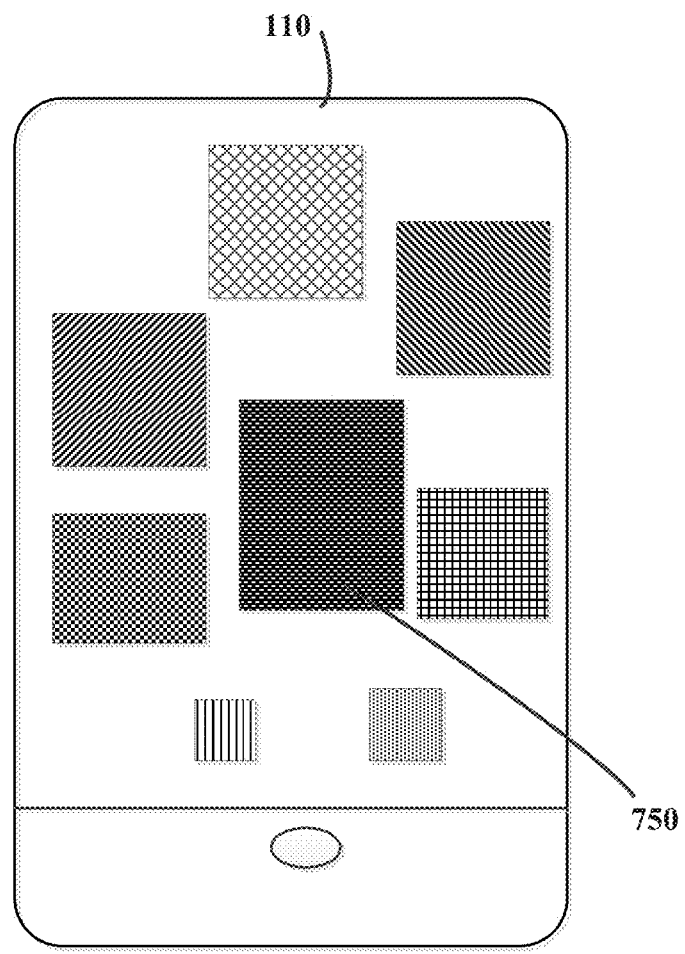
FIG. 7b is a schematic diagram illustrating a user interface showing an arrangement of the similar images in accordance with one embodiment.

FIG. 7b is a schematic diagram illustrating a user interface showing an arrangement of the similar images transmitted by the image-based recommendation system 100 in accordance with one embodiment. The user interface is configured to arrange the similar images based on their rankings which are indicative of their respective relevancies to the user-selected images. The images are arranged so that an image that is most relevant to the user selections 612, 614 and 616 is arranged at the center. In one embodiment, other images are arranged around the central image 750 and their varying sizes can be indicative of their respective relevancies to the user selections 612, 614 and 616 so that larger images are indicative of greater relevance.

It may be appreciated that the first set 610 and the second set 710 have equal number of images only by the way of illustration and that the second set of images 710 can have more or less number of images than the first set 610. It can be further appreciated that if all the images in one of the sets 610, 710 cannot be accommodated on a single display on the user device 110, they may be arranged into multiple screens with links providing access from one screen to another in accordance with one embodiment. It may be further appreciated that the concept of image similarity is shown and described herein in terms of patterns only by the way of illustration and not limitation and that image similarity can be determined based on various image characteristics and content of the images and that the image-based recommendation system 100 is configured to identify such similarities in accordance with the various methodologies described herein.

Figure 8:
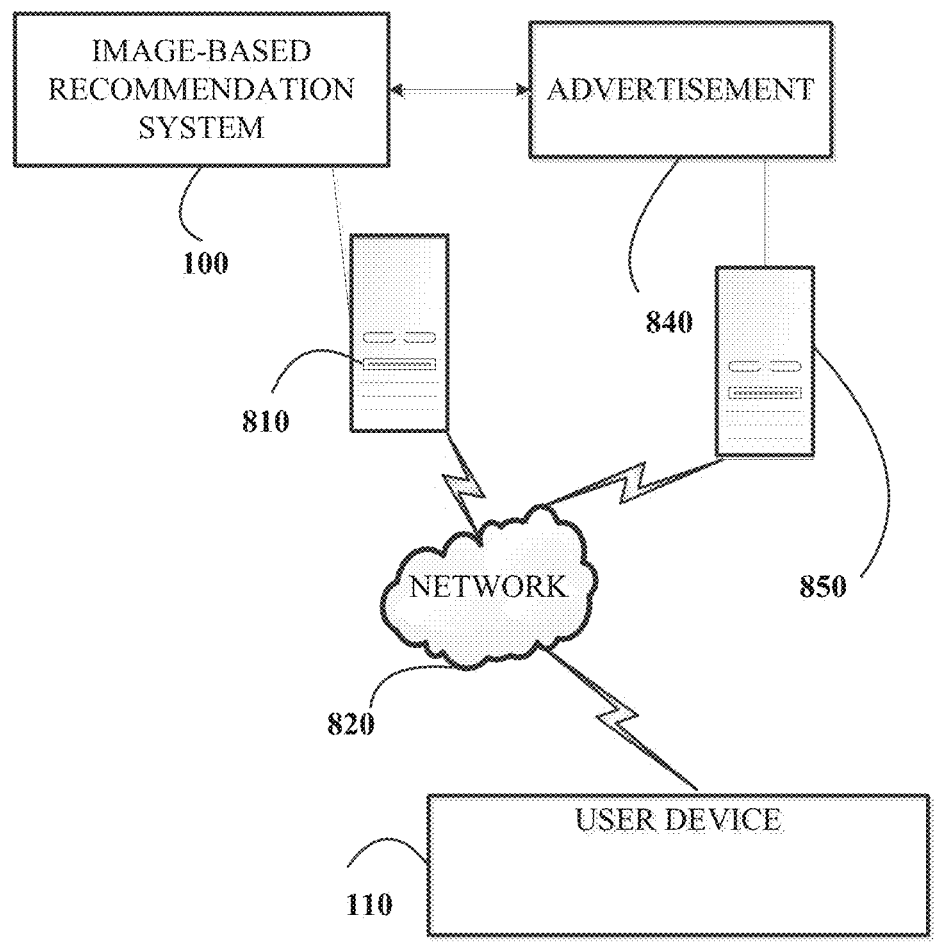
FIG. 8 illustrates a schematic diagram of a system for identifying and transmitting recommended images for user selection and purchase in accordance with embodiments described herein.

FIG. 8 illustrates a schematic diagram 800 of a system for identifying and transmitting recommended images for user selection and purchase in accordance with embodiments described herein. The system 800 includes a client/user device 110 employed by a user for accessing the image-based recommendation system 100. In an embodiment, the image-based recommendation system 100 can transmit an initial set of images 610 to the user device 110 without any explicit user request. In an embodiment, the user device 110 transmits a request for access to the recommendation system 100 via a network 820, such as one or more of the Internet or a cellular network, to a computing device comprising a server 810. It may be appreciated that only one user device 110 is shown for illustrative purposes and that any number of devices of different types including mobile devices such as smartphones, tablet computers, laptops or stationary devices such as desktops can access the recommendation system 100, request for and receive image-based product recommendations in accordance with embodiments described herein. The server 810 that hosts the image-based recommendation system 100 receives the request and transmits a webpage or user interface with the initial set of images 610 for display at the user device 110. In response to receiving the initial set of images 610, the user can select a plurality of images 612, 614 and 616 from the initial set 610 in accordance with one embodiment. The user selections 612, 614 and 616 are communicated by the user device 110 to the recommendation system 100 via the network 820. The recommendation system 100 analyzes the user selections 612, 614 and 616 and transmits a second set of selectable images 710 to the user device 110 via the network 820. When a single user selection of image 712 is transmitted by the user device 110, the recommendation system 100 provides the product page associated with the image 712 to facilitate purchase activity or further browsing by the user associated with the product featured in image 712. It may be appreciated that in an embodiment, the user can make multiple selections from the second set of images 710 in which case the recommendation system 100 can further analyze the multiple selections from the second set 710 and provide a third set of images. The user interfaces 610, 710 thus facilitate the various interactions of the user with the recommendation system 100 in accordance with embodiments described herein. In an embodiment, the user device 110 can also include one or more advertisements retrieved from an ad-server 850.

Figure 9:
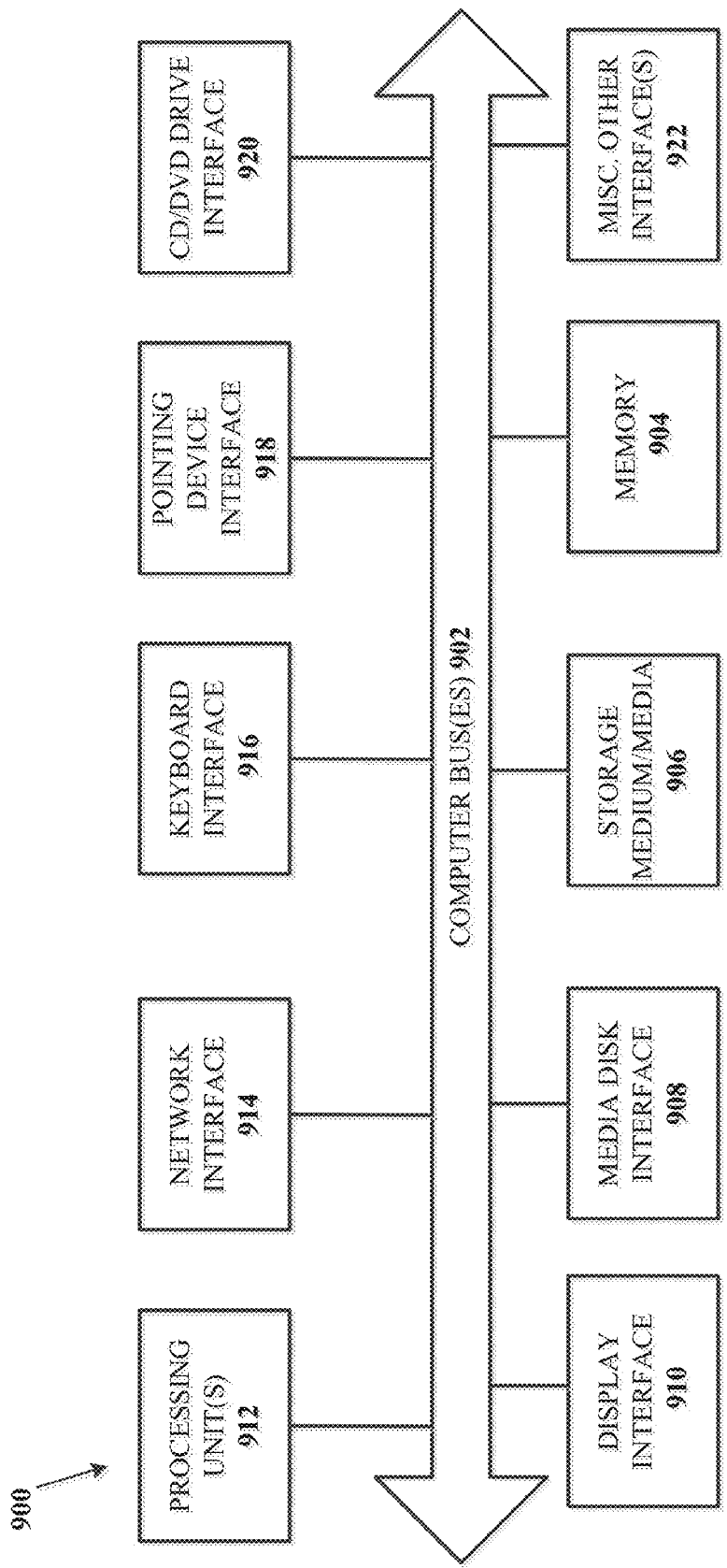
FIG. 9 illustrates internal architecture of a computing device in accordance with embodiments described herein.

As shown in the example of FIG. 9, internal architecture of a computing device 900 includes one or more processing units (also referred to herein as CPUs) 912, which interface with at least one computer bus 902. Also interfacing with computer bus 902 are persistent storage medium/media 906, network interface 914, memory 904, e.g., random access memory (RAM), run-time transient memory, read only memory (ROM), etc., media disk drive interface 908, an interface 920 for a drive that can read and/or write to media including removable media such as floppy, CD-ROM, DVD, etc., media, display interface 910 as interface for a monitor or other display device, keyboard interface 916 as interface for a keyboard, pointing device interface 918 as an interface for a mouse or other pointing device, and miscellaneous other interfaces 922 not shown individually, such as parallel and serial port interfaces, a universal serial bus (USB) interface, and the like.

Memory 904 interfaces with computer bus 902 so as to provide information stored in memory 904 to CPU 912 during execution of software programs such as an operating system, application programs, device drivers, and software modules that comprise program code or logic, and/or computer-executable process steps, incorporating functionality described herein, e.g., one or more of process flows described herein. CPU 912 first loads computer-executable process steps or logic from storage, e.g., memory 904, storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage medium/media 906 is a computer readable storage medium(s) that can be used to store software and data, e.g., an operating system and one or more application programs. Persistent storage medium/media 906 can also be used to store device drivers, such as one or more of a digital camera driver, monitor driver, printer driver, scanner driver, or other device drivers, web pages, content files, metadata, playlists and other files. Persistent storage medium/media 906 can further include program modules and data files used to implement one or more embodiments of the present disclosure.

Figure 10:
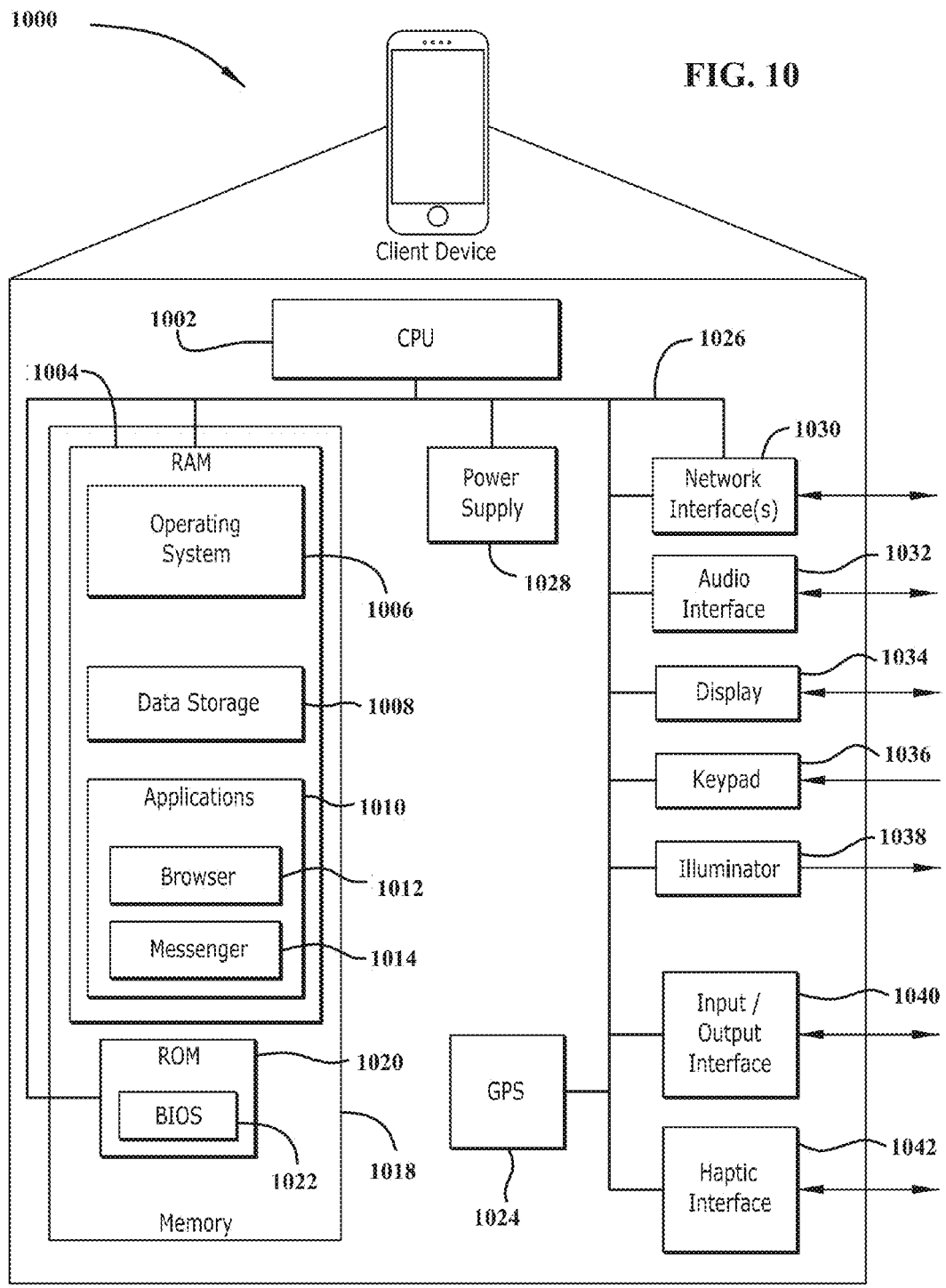
FIG. 10 is a schematic diagram illustrating a client device implementation of a computing device in accordance with embodiments of the present disclosure.

FIG. 10 is a schematic diagram illustrating a client device implementation of a computing device in accordance with embodiments of the present disclosure. A client device 1000 may include a computing device capable of sending or receiving signals, such as via a wired or a wireless network, and capable of running application software or "apps". A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device can include standard components such as a CPU 1002, power supply 1028, a memory 1018, ROM 1020, BIOS 1022, network interface(s) 1030, audio interface 1032, display 1034, keypad 1036, illuminator 1038, I/O interface 1040 interconnected via circuitry 1026. Claimed subject matter is intended to cover a wide range of potential variations. For example, the keypad 1036 of a cell phone may include a numeric keypad or a display 1034 of limited functionality, such as a monochrome liquid crystal display (LCD) for displaying text. In contrast, however, as another example, a web-enabled client device 1000 may include one or more physical or virtual keyboards 1036, mass storage, one or more accelerometers, one or more gyroscopes, global positioning system (GPS) 1024 or other location identifying type capability, Haptic interface 1042, or a display with a high degree of functionality, such as a touch-sensitive color 2D or 3D display, for example. The memory 1018 can include Random Access Memory 1004 including an area for data storage 1008.

A client device 1000 may include or may execute a variety of operating systems 1006, including a personal computer operating system, such as a Windows, iOS or Linux, or a mobile operating system, such as iOS, Android, or Windows Mobile, or the like. A client device 1000 may include or may execute a variety of possible applications 1010, such as a client software application 1014 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 1000 may also include or execute an application to communicate content, such as, for example, textual content, multimedia content, or the like. A client device 1000 may also include or execute an application 1010 to perform a variety of possible tasks, such as browsing, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
providing, by a computing device, a plurality of images for selection to a client device of a user;
receiving, by the computing device from the client device, user selections from the plurality of images;
determining, by the computing device, a number of user selections from the plurality of images;
determining, by the computing device, if the number of user selections from the plurality of images is less than, equal to or greater than one, wherein when the determined number of user selections from the plurality of images is greater than one, an image selection procedure is executed by the computing device, the image selection procedure comprising:
extracting, by the computing device, features of the user selected images; retrieving, by the computing device, other images from a data store based upon the extracted features;
clustering, by the computing device, the other retrieved images and the user-selected images based on the extracted features;
identifying, by the computing device, at least one cluster comprising the other retrieved images and at least one of the user-selected images;
ranking, by the computing device, the images from the at least one cluster based on respective relevancies to the user-selected images;
transmitting, by the computing device, images from the at least one cluster comprising the other retrieved images and at least one of the user-selected images as similar images for selection to the user;

configuring, via the computing device, a display of the similar images based on the ranking;

when the determined number of user selections from the plurality of images is equal to one, a product selection procedure is executed by the computing device, the product selection procedure comprising:

providing, via the computing device, to the client device, details of a product associated with the user-selected image from the plurality of images;

facilitating purchase, via the computing device, of the product associated with the selected image; and providing, by the computing device, the user-selected image from the plurality of images as training data for increasing precision of the identification of similar images, comprising:

receiving, by the computing device, the user-selected image from the plurality of images as a cluster;

determining, by the computing device, with a verified model that the precision of similarity identification is less than a predetermined threshold; and increasing, by the computing device, the precision by providing more training data until the precision of similarity identification reaches the predetermined threshold; and when the determined number of user selections from the plurality of images is equal to zero, providing, by the computing device, a second plurality of images for selection.

2. The method of claim 1, wherein identifying other images further comprises:

identifying, by the computing device, the other images based on tags associated with the user-selected images and the other images.

3. The method of claim 1, wherein the plurality of images is provided in response to a user request.

4. The method of claim 1, wherein a SIFT (Scale Invariant Feature Transform) algorithm is used for extracting the features of the user-selected images.

5. The method of claim 1, wherein a KNN (K nearest neighbor) algorithm is used for the clustering.

6. A computing system comprising:

at least one processor;

a non-transitory computer-readable storage medium for tangibly storing thereon program logic for execution by the processor, the program logic comprising:

providing, by the computing device, a plurality of images for selection to a client device of a user;

receiving, by the computing device from the client device, user selections from the plurality of images;

determining, by the computing device, a number of user selections from the plurality of images;

determining, by the computing device, if the number of user selections from the plurality of images is less than, equal to or greater than one, wherein when the determined number of user selections from the plurality of images is greater than one, an image selection procedure is executed by the computing device, the image selection procedure comprising:

extracting, by the computing device, features of the user selected images;

retrieving, by the computing device, other images from a data store based upon the extracted features;

clustering, by the computing device, the other retrieved images and the user-selected images based on the extracted features;

identifying, by the computing device, at least one cluster comprising the other retrieved images and at least one of the user-selected images;

ranking, by the computing device, the images from the at least one cluster based on respective relevancies to the user-selected images;

transmitting, by the computing device, images from the at least one cluster comprising the other retrieved images and at least one of the user-selected images as similar images for selection to the user;

configuring, via the computing device, a display of the similar images based on the ranking;

when the determined number of user selections from the plurality of images is equal to one, a product selection procedure is executed by the computing device, the product selection procedure comprising:

providing, via the computing device, to the client device, details of a product associated with the user-selected image from the plurality of images;

facilitating purchase, via the computing device, of the product associated with the selected image; and providing, by the computing device, the user-selected image from the plurality of images as training data for increasing precision of the identification of similar images, comprising:

receiving, by the computing device, the user-selected image from the plurality of images as a cluster;

determining, by the computing device, with a verified model that the precision of similarity identification is less than a predetermined threshold; and increasing, by the computing device, the precision by providing more training data until the precision of similarity identification reaches the predetermined threshold; and when the determined number of user selections from the plurality of images is equal to zero, providing, by the computing device, a second plurality of images for selection.

7. A non-transitory computer readable storage medium tangibly encoded with computer-executable instructions, that when executed by a computing device, perform a method comprising:

providing, by the computing device, a plurality of images for selection to a client device of a user;

receiving, by the computing device from the client device, user selections from the plurality of images;

determining, by the computing device, a number of user selections from the plurality of images;

determining, by the computing device, if the number of user selections from the plurality of images is less than, equal to or greater than one, wherein when the determined number of user selections from the plurality of images is greater than one, an image selection procedure is executed by the computing device, the image selection procedure comprising:

extracting, by the computing device, features of the user selected images;

retrieving, by the computing device, other images from a data store based upon the extracted features;

clustering, by the computing device, the other retrieved images and the user-selected images based on the extracted features;

identifying, by the computing device, at least one cluster comprising the other retrieved images and at least one of the user-selected images;

ranking, by the computing device, the images from the at least one cluster based on respective relevancies to the user-selected images;

transmitting, by the computing device, images from the at least one cluster comprising the other retrieved images and at least one of the user-selected images as similar images for selection to the user; configuring, via the computing device, a display of the similar images based on the ranking;

when the determined number of user selections from the plurality of images is equal to one, a product selection procedure is executed by the computing device, the product selection procedure comprising:

providing, via the computing device, to the client device, details of a product associated with the user-selected image from the plurality of images;

facilitating purchase, via the computing device, of the product associated with the selected image; and providing, by the computing device, the user-selected image from the plurality of images as training data for increasing precision of the identification of similar images, comprising:

receiving, by the computing device, the user-selected image from the plurality of images as a cluster;

determining, by the computing device, with a verified model that the precision of similarity identification is less than a predetermined threshold; and increasing, by the computing device, the precision by providing more training data until the precision of similarity identification reaches the predetermined threshold; and when the determined number of user selections from the plurality of images is equal to zero, providing, by the computing device, a second plurality of images for selection.

* * * * *